(12) United States Patent
Gilpin

(10) Patent No.: US 10,248,807 B2
(45) Date of Patent: Apr. 2, 2019

(54) ENHANCED PERMISSION ALLOCATION IN A COMPUTING ENVIRONMENT

(71) Applicant: Conjur, Inc., Waltham, MA (US)

(72) Inventor: Kevin Gilpin, Weston, MA (US)

(73) Assignee: CONJUR, INC., Waltham, MA (US)

( * ) Notice: Subject to any disclaimer, the term of this patent is extended or adjusted under 35 U.S.C. 154(b) by 294 days.

(21) Appl. No.: 15/286,342

(22) Filed: Oct. 5, 2016

(65) Prior Publication Data

US 2017/0098095 A1 Apr. 6, 2017

Related U.S. Application Data

(60) Provisional application No. 62/237,796, filed on Oct. 6, 2015.

(51) Int. Cl.
*G06F 21/62* (2013.01)
*G06F 11/07* (2006.01)

(52) U.S. Cl.
CPC ...... *G06F 21/6218* (2013.01); *G06F 11/0706* (2013.01); *G06F 11/0766* (2013.01); *G06F 11/0793* (2013.01)

(58) Field of Classification Search
CPC .. G06F 11/0793; G06F 11/30; G06F 11/0766; G06F 11/0706; G06F 9/542; G06F 2201/86; G06F 2201/865; G06F 21/6218; H04L 69/40; H04L 1/0061; H04L 63/102; H04L 63/1416
See application file for complete search history.

(56) References Cited

U.S. PATENT DOCUMENTS

| | | | | |
|---|---|---|---|---|
| 5,594,861 A | * | 1/1997 | Jonsson | G06F 11/0715 379/242 |
| 5,822,583 A | * | 10/1998 | Tabuchi | G06F 9/542 718/100 |
| 2016/0057151 A1 | * | 2/2016 | Brock | H04L 63/102 726/4 |

* cited by examiner

*Primary Examiner* — Brian F Shaw
(74) *Attorney, Agent, or Firm* — Finnegan, Henderson, Farabow, Garrett & Dunner LLP

(57) ABSTRACT

Examples provided herein enhance the management of permissions based on error reporting in a computing environment. Enhanced permission allocation in a computing environment includes obtaining an error report for an application operating within the computing environment. Based on the error report, permission changes are identified to assist in addressing one or more reported errors. Permission changes can include new, temporary, suspended, updated, modified and/or other permissions for new and/or existing members. Some or all of the identified permission changes can then be allocated to new and/or existing members of the computing environment. Some permission changes may include temporary permissions that provide changed permissions for a limited time period. If an error is not fully addressed, additional evaluation and identification of permission changes can be conducted. Based on this further evaluation, the permission changes can then be updated.

20 Claims, 4 Drawing Sheets

ENHANCED PERMISSION ALLOCATION IN A COMPUTING ENVIRONMENT

RELATED APPLICATIONS

This application hereby claims the benefit of and priority to U.S. Provisional Patent Application 62/237,796, entitled "ENHANCED PERMISSION ALLOCATION IN A COMPUTING ENVIRONMENT," filed 6 Oct. 2015, and which is hereby incorporated by reference in its entirety.

TECHNICAL FIELD

Aspects of the disclosure are related to the field of access control in computing environments and, in particular, managing permissions based on identified application errors.

TECHNICAL BACKGROUND

Virtualization techniques have gained popularity and are now commonplace in data centers and other computing environments in which it is useful to increase the efficiency with which computing resources are used. In a virtualized environment, one or more virtual nodes are instantiated on an underlying host computer and share the resources of the underlying computer. Rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes.

In some implementations, computing environments may employ multiple applications or processes that are generated to perform desired tasks. For example, a first application may comprise a front-end service operating on one or more computing nodes for an organization, while a second application may comprise a back-end service operating on one or more computing nodes for the same organization. Because each of the applications provide different operations and have access to different data sets, the applications may be provided with differing sets of permissions. These permissions, which may include user permissions, regulate the storage disks available to the application, the network addresses available to the application, the ability to install or modify software associated with the application, and/or other permissions. However, as more applications are deployed within a computing environment, difficulties may arise in adequately supporting each of the applications when errors or issues arise.

OVERVIEW

Enhanced permission allocation in a computing environment includes obtaining an error report for an application operating within the computing environment. Based on the error report, permission changes are identified to assist in addressing one or more reported errors. Permission changes can include new, temporary, suspended, updated, modified and/or other permissions for new and/or existing members. Some or all of the identified permission changes can then be allocated to new and/or existing members of the computing environment. Some permission changes may include temporary permissions that provide changed permissions for a limited time period. If an error is not fully addressed, additional evaluation and identification of permission changes can be conducted. Based on this further evaluation, the permission changes can then be updated.

In one implementation, a method of allocating permissions in a computing environment includes obtaining an error report for an application within the computing environment. In response to receiving the error report, the method further provides identifying temporary permissions for the application based on an identity of the application and an error indicated in the error report. The method also includes allocating the temporary permissions to one or more members of the computing environment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
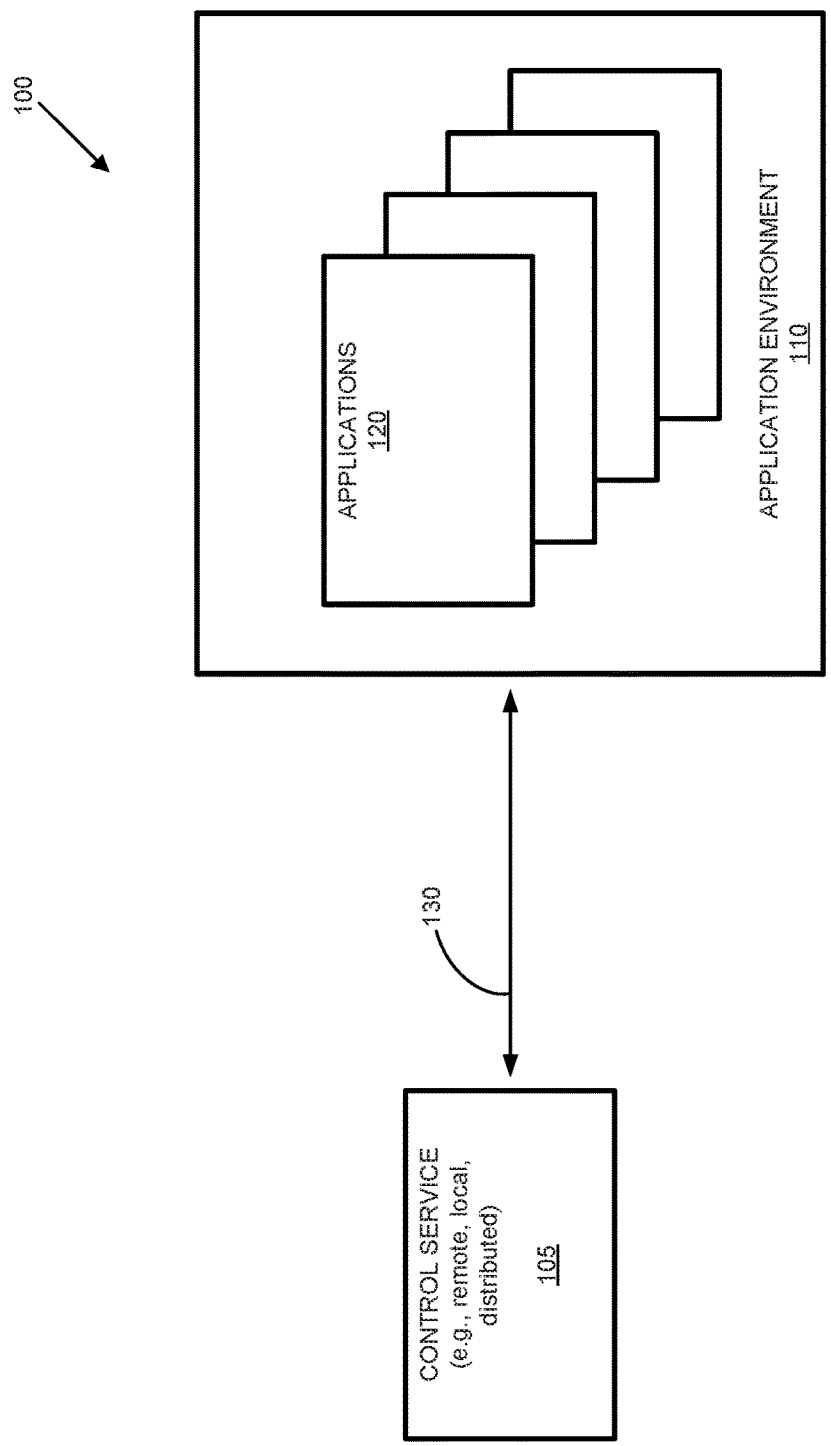
FIG. 1 illustrates a computing environment for allocating permissions and/or permission changes to members based on an error report.

The various figures and descriptions included herein discuss many examples for enhanced permission allocation based on errors identified in a computing environment. In particular, modern computing environments include physical computing systems, which provide a platform for applications and other virtual nodes. These virtual nodes may include full operating system virtual machines, Linux containers, such as Docker containers, jails, or other similar types of virtual containment nodes. The applications executing on the physical and virtual systems provide different operations, and may be associated with different sets of users or members related with the particular operations. For example, a group of developers may be assigned to a first set of nodes with a first application, while administrators are assigned to a second set of nodes with a second application.

Difficulties in error handling are often compounded when users or members associated with a particular application are provided with a permission set that prevents the members from responding to the error. Because each of the applications may be provided with a different operation, different permissions may be provided to members associated with the application. These permissions may permit the members to access particular storage locations or disks, modify particular settings (e.g., associated with the application, virtual nodes, and/or hosts), manage network connections for the application, and/or other permissions associated with the application and the corresponding nodes. Accordingly, while a first set of members associated with a first application may be able to modify firewall settings for the nodes for the application, a second set of members may be unable to modify the firewall settings in the environment. These permissions allocated to the members may be generated by an administrator of the computing environment based on the type of application, the type of members that require access to the application, and/or other determinations.

Although the permissions that are allocated to the applications and members may be useful during normal operation of the computing environment, difficulties often arise when an error is encountered by an application in the environment. These errors may include hardware issues, software issues, malware or security issues, and/or other errors capable of being identified with the application. When an error is identified for an application, the current permissions allocated to members associated with the application may prevent an appropriate response to the error.

In some implementations of enhanced permission allocation in a computing environment, to assist in responding to identified errors in the computing environment, a control service can dynamically allocate permissions relating to applications in a computing environment. In particular, the control service identifies an error that has occurred within the computing environment, then identifies temporary and/or other permission rules that can be applied to respond to and/or facilitate a response to the error, and then implements the permission rule(s) within the computing environment. These permission rules may include providing access to the affected application nodes to a new set of users, providing additional permissions to current users to allow them to make additional changes for the application, and/or other temporary permission allocations to respond to the identified error.

FIG. 1 illustrates a computing environment 100 providing enhanced permission allocation to members based on an error report. Computing environment 100 includes control service 105 and application environment 110, which can communicate through appropriate means 130 (e.g., a public or private network, the Internet, an intranet, one or more control channels, a management system, etc.). Application environment 110 can include physical computing systems and/or virtual computing nodes that provide support for applications 120. Applications 120 may comprise front-end applications, back-end applications, database applications, or any other similar applications.

In operation, applications 120 may be associated with members (e.g., users) that can manipulate and manage various applications in the environment. These members for each application are provided with permissions (e.g., dictating authorization levels, such as what disks the members are allowed to access, network functions the members are allowed to access, settings that the members are allowed to access, and/or other permissions). These permissions prevent members of the application from inappropriately modifying or accessing portions of the computing environment or otherwise acting in an unauthorized manner with regard to the computing environment.

Although permissions provided to the members of the applications may be sufficient during normal operations of application environment 110, difficulties can arise when an error is encountered by one or more of the applications. For example, an application may encounter an issue with a physical storage disk that belongs to the application, however, the permissions for members associated with the application may prevent the members from taking action with regard to the disk. To enhance the response to these types of errors, control service 105 receives one or more error reports from applications 120. Such error reports may be transmitted to control service 105 (e.g., by software monitoring tools on the physical and virtual computing systems of the computing environment 100), and permit control service 105 to modify (e.g., temporarily modify) the permissions allocated to the application associated with the error. Such changed permissions may be provided to members that were previously associated with the application (including suspending or limiting previously-granted permissions for existing members), and/or may be provided to new members (e.g., parties capable of fixing or monitoring the identified issue). Referring to the previous non-limiting example of a problem or other issue with a physical storage disk, permissions may be provided that allow members to monitor the physical storage disk's operations, make changes to the physical storage disk, and/or other permission modifications for the affected application.

Figure 2:
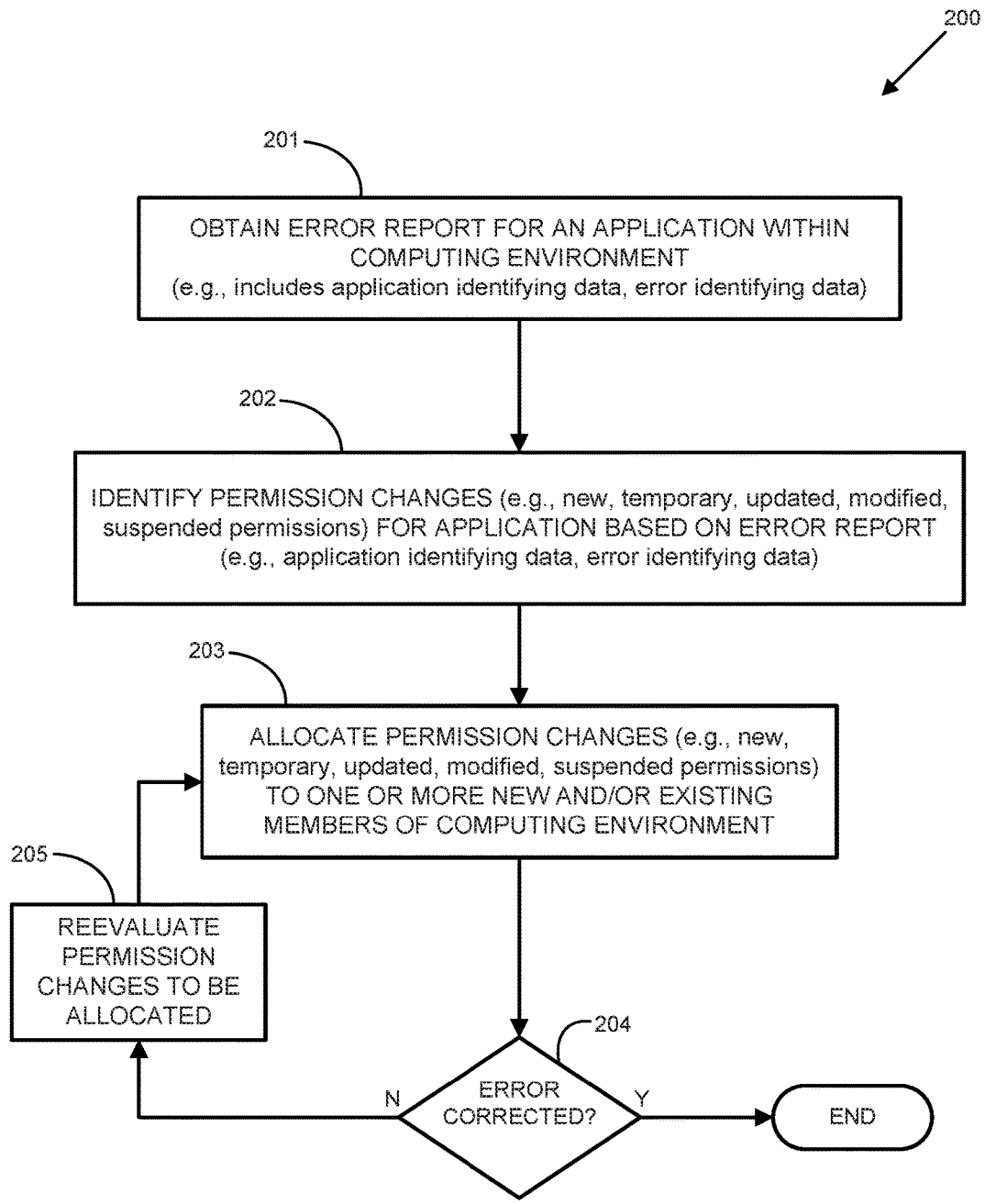
FIG. 2 illustrates a method of providing permissions and/or permission changes to members based on an error report.

FIG. 2 illustrates a method 200 of providing permission changes to members based on an error report, helping demonstrate the allocation of temporary and/or other permissions in a computing environment. The operations of FIG. 2 are described parenthetically in the description below, in view of computing environment 100 from FIG. 1.

As described in FIG. 1, a computing environment may include a plurality of applications to provide desired operations. These applications may each be provided with a set of permissions for one or more members belonging to the computing environment. These members may include security personnel, developers, sales persons, and/or other members of the computing environment (e.g., employees). Once the permissions are allocated to the members, and the applications of the computing environment are operational, the applications may report errors to a control service, such as control service 105.

Control service 105 obtains an error report for an application within the computing environment (201). The error report may be generated and sent to the control service for various reasons (e.g., automatically or after a request from the control service) and may include various types of information (e.g., application identifying data and error identifying data). Once an error report is obtained, control service 105 identifies permission changes useful for addressing the error pertaining to the application (based on application identity data and one or more errors indicated in the error report) (202). The permission changes may include new, temporary, suspended, updated, modified and/or other permissions for existing members that already have allocated access to the application, and/or may include new members that can be allocated access to the application as a result of the error. The permission changes may include permissions to monitor the error within the application, take action to cure or prevent the error for the application (e.g., eliminating, mitigating, or forcing states and/or other conditions), and/or other action.

As an illustrative example, an application in application environment 110 may provide an identifier for the application that encountered the error with an identifier for the type of error encountered (e.g., transmitting an error report to control service 105 comprising error sets identifying an application and its associated error and, in some implementations, other information to assist control service 105 in assessing the error and mitigation or elimination of the error situation through temporary permission changes). Based on the information provided in the report, control service 105 identifies temporary and/or other permissions (i.e., permission changes) that can be provided to the application to support correction, elimination, prevention, mitigation, monitoring and/or other treatment of the identified error(s). For instance, if a cache file for an application exceeds an allocated amount of data storage space, a permission set may be identified to address the error from the cache file for the particular application. The permission set may include permissions to increase the size of the cache file, remove content from the cache file, monitor changes within the cache file, and/or other permissions related to the cache file.

After determining responsive permission changes based on the error report, control service 105 allocates the permission changes (e.g., temporary permissions) to one or more members of the computing environment (203), where members can include, for example, individuals affiliated with computing environment 110 (e.g., administrators, users, developers, security personnel), and/or virtual machines and/or entities in or affiliated with the computing environment 110. Permission allocations may include providing credentials that permit members access to computing nodes for the application, suspending or limiting permissions previously granted to one or more members, permitting access to particular settings on computing nodes, and/or other ways of providing permissions to new or existing qualified members of the computing environment. In some implementations, permission changes that are allocated relative to an application may be configured to expire after a period of time. This period of time may be based on the type of error encountered in the application, the type of application, the members associated with the application, and/or other time period determination factors. Once the time period expires, the permissions that had been allocated relative to the application may revert to the pre-existing or permanent permissions, or control service 105 may evaluate whether the error is still present on the application. If the error is still present on the application (204), control service 105 can reevaluate the previously allocated and implemented permission changes (205) and may delegate new permissions to members of the computing environment (203) to develop a solution to or otherwise address the error.

Figure 3:
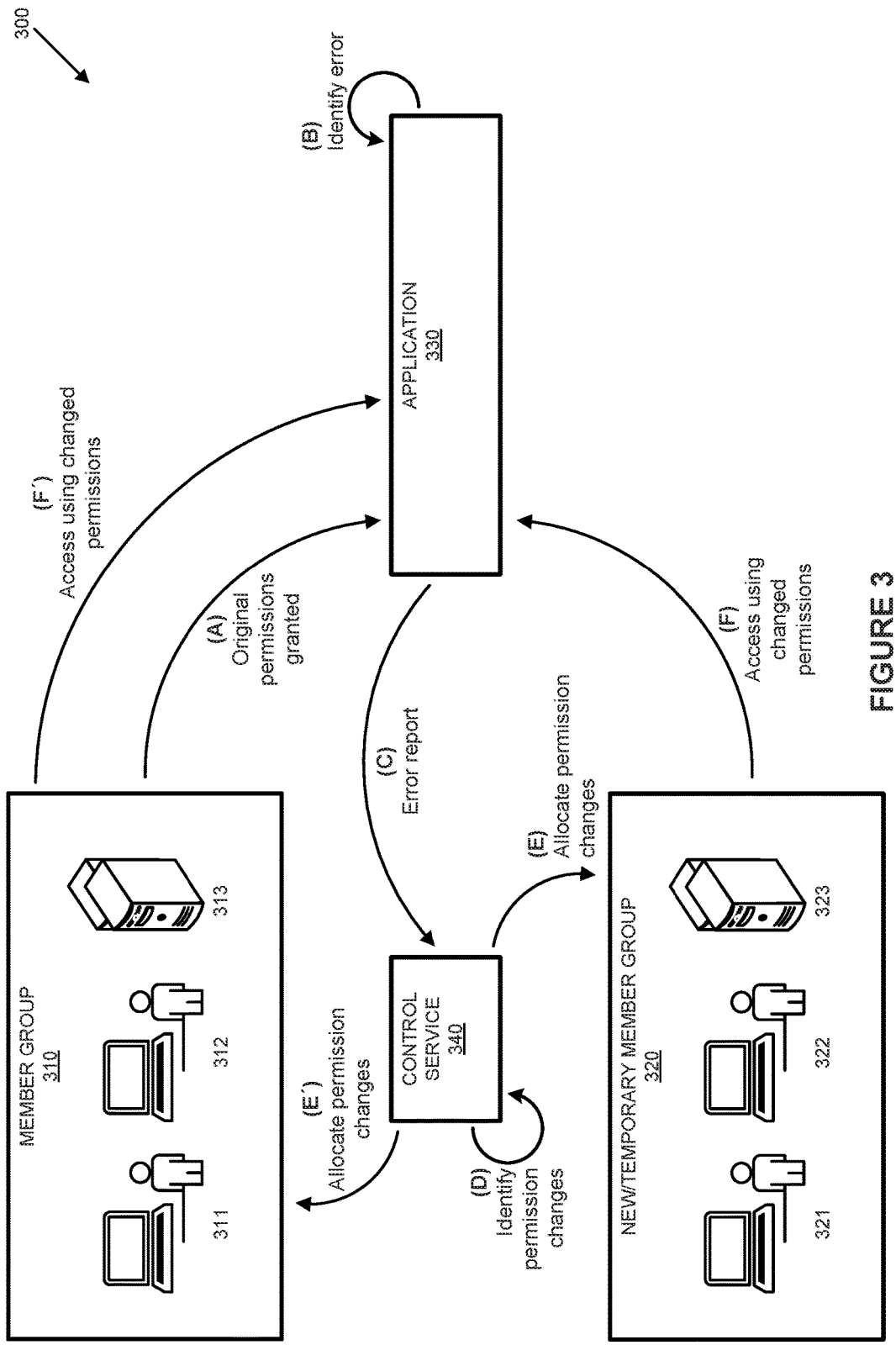
FIG. 3 illustrates an operational scenario of allocating permissions and/or permission changes to members based on an error report.

FIG. 3 illustrates an operational scenario 300 illustrating permissions allocation to members based on an error report. Operational scenario 300 includes member group 310, new and/or temporary member group 320, application 330, and control service 340. Application 330 can comprise one or more applications employed within a computing environment, including front-end applications, data analysis applications, database applications, and the like. Control service 340 is an example of control service 105 from FIG. 1, although other examples may exist (e.g., a local control service, a remote control service, one or more distributed control services).

As illustrated in operational scenario 300, member group 310 includes members 311, 312 and 313 that have been granted original access or permissions (step (A)) to make changes to or otherwise interact with application 330. These original permissions may include disk read/write permissions, network access permissions, settings modification permissions, and/or other permissions delegated by an administrator for members of member group 310 and application 330. During operation of application 330, an error is identified (step (B)) for the application 330. This error may be identified by application 330 itself, may be identified by an agent operating on computing nodes that support application 330, may be identified by computing nodes external to application 330, or may be identified by other means. Once the error is identified, an error report is generated and transferred (step (C)) to control service 340. Control service 340 obtains the error report and identifies permission changes relevant to addressing the reported error (step (D)).

In some implementations, the error report may include identifier data for the application ("application identifying data"), as well as identifier data for the type of error encountered ("error identifying data"). Accordingly, based on the application identifying data and error identifying data, control service 340 may identify one or more permission changes (step (D)) to support the application. This determination may be made using one or more tables, trees, algorithms and/or other data structures and/or operations that assist in defining permission changes based on provided application and error identifying data.

Here, control service 340 identifies temporary member group 320 to be provided with permissions for the application. An optional temporary member group 320 may comprise a security group, a hardware management group, or any other similar group that relates to the identified error. Once temporary member group 320 is identified as being relevant to the reported error, control service 340 allocates the required permissions to the new group (step (E)). In some implementations, this may include providing credentials and other similar information permitting members 321-323 to access the appropriate settings for application 330. These credentials may be supplied to the host computing systems for the application, as well as any virtual computing nodes that support the application. Additionally, one or more members of existing member group 310 may be allocated updated permissions (step (E')).

After allocating the permissions, temporary member group 320 may access the required elements of the application (step (F)) to monitor the error, make changes to remedy the error, or take any other similar action against the error. Existing member group 310 may also utilize permission changes (step (F')). In some implementations, the permission changes that are identified for the application may be limited to a predefined period of time. This period of time, which may comprise an hour, a day, or some other period, may be determined based on the type of error identified, the type of application experiencing the error, the type of action required to remedy the error, and/or for other reasons.

Although illustrated in the present example as providing the permissions to a new set of members, it should be understood that temporary permissions might be provided to members that previously had access to settings of the application. Referring to the example in FIG. 3, members 311-313 might be provided with permissions that allow the members to make changes to the application. For example, prior to identifying an error, members 311-313 might be incapable of clearing caches that cause the error in the application. However, once the error is identified, control service 340 may allocate temporary permissions that allow members 311-313 to clear the caches and improve the operation of application 330. Thus control service 340 may allocate a primary set of permission changes to address a reported error, following up with a secondary set of permission changes at a later time in the event that the first permission changes were ineffective.

Figure 4:
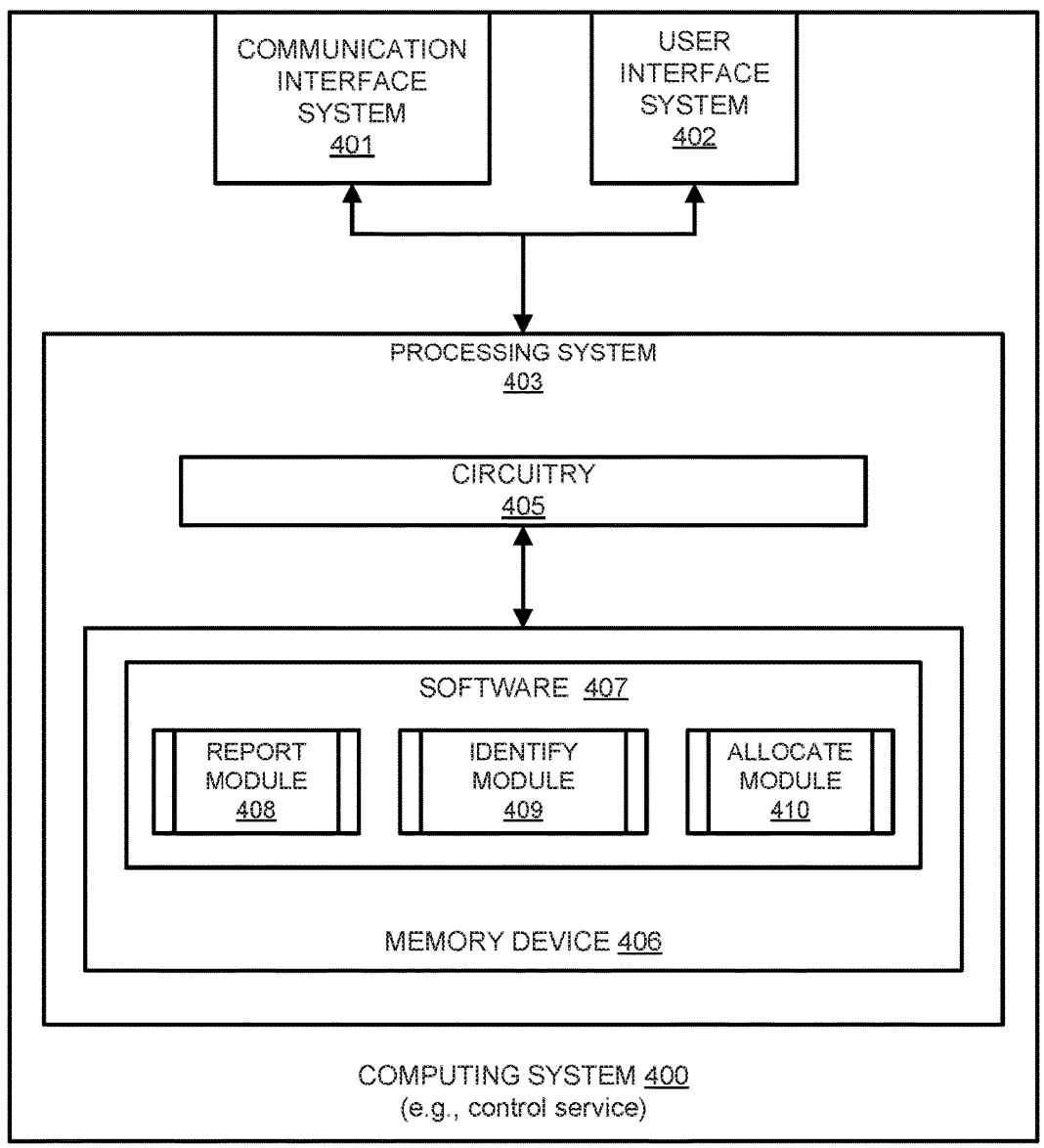
FIG. 4 illustrates a computing system to allocate permissions and/or permission changes to members based on an error report.

FIG. 4 illustrates one or more implementations of a control service implemented as a computing system 400 configured to allocate permissions to members based on an error report. Computing system 400 is representative of any computing system or systems with which the various operational architectures, processes, scenarios, and sequences disclosed herein for a control service may be implemented. Computing system 400 is a non-limiting example of control service 105 and control service 340, and other examples may exist. Computing system 400 may comprise one or more server computing systems, desktop computing systems, routers, gateways, switches, and other similar computing elements, including combinations thereof. Computing system 400 comprises a communication interface system 401, a user interface system 402, and processing system 403. Processing system 403 is linked to communication interface system 401 and user interface system 402. Processing system 403 includes processing circuitry 405 and memory device 406 that stores operating software 407. It may be understood that system 400 is generally intended to represent one or more computing systems on which software 407 may be deployed and executed (e.g., in order to implement control service(s) 105 and/or 340). However, system 400 may also be suitable as any computing system on which software 407 may be staged and from where one or both may be distributed, transported, downloaded, or otherwise provided to yet another computing system for deployment and execution, or yet additional distribution.

Communication interface system 401 comprises components that communicate over communication links, such as network cards, ports, radio frequency (RF) transceivers, processing circuitry and software, or some other communication devices. Communication interface system 401 may be configured to communicate over metallic, wireless, or optical links. Communication interface system 401 may be configured to use Time Division Multiplex (TDM), Internet Protocol (IP), Ethernet, optical networking, wireless protocols, communication signaling, or some other communication format—including combinations thereof. Communication between system 400 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transmission control protocol (TCP), and the user datagram protocol (UDP), as well as any other suitable communication protocol, variation, or combination thereof.

User interface system 402 comprises components that interact with a user to receive user inputs and to present media and/or information. User interface system 402 may include a speaker, microphone, buttons, lights, display screen, touch screen, touch pad, scroll wheel, communication port, or some other user input/output apparatus—including combinations thereof. User interface system 402 may be omitted in some examples.

Processing circuitry 405 comprises microprocessor and other circuitry that retrieves and executes operating software 407 from memory device 406. Memory device 406 comprises a non-transitory storage medium, such as a disk drive, flash drive, data storage circuitry, or some other memory apparatus. Processing circuitry 405 is typically mounted on a circuit board that may also hold memory device 406 and portions of communication interface system 401 and user interface system 402. Operating software 407 comprises computer programs, firmware, or some other form of machine-readable processing instructions. Operating software 407 includes report module 408, identify module 409, and allocate module 410, although any number of software modules may provide the same and additional operations. Operating software 407 may further include an operating system, utilities, drivers, network interfaces, applications, or some other type of software. When executed by processing circuitry 405, operating software 407 directs processing system 403 to operate computing system 400 as described herein.

In operation, report module 408 directs processing system 403 to obtain an error report for an application within a computing environment. In some implementations, computing system 400 may be communicatively coupled, via Ethernet, wireless, or some other communication protocol to computing nodes within a computing environment that provide a platform for multiple applications. To identify the error, the applications on the computing nodes, agents on the computing nodes, or some other process in the computing environment may identify the error and provide information about the error to computing system 400. Once the error report is obtained by computing system 400, identify module 409 directs processing system 403 to identify temporary permissions for the application based at least in part on the error indicated in the error report. Allocate module 410 then directs processing system 403 to allocate the temporary permissions to one or more new and/or existing members of the computing environment. This allocation of permissions may include configuring computing nodes to permit changes by the one or more new and/or existing members, wherein the new and/or existing members may include members which were allocated permissions prior to the error, and/or members that were not previously allocated permissions to the application, and further wherein the members allocated permissions may be individuals and/or virtual and/or other components of the computing environment.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts. It is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a control service for cloud-based applications in a virtualized computing environment, the method comprising:

obtaining an error report for a cloud-based application operating within the virtualized computing environment, wherein the error report comprises application identifying data and error identifying data, and wherein an error indicated in the error report is caused by a malware issue;

identifying a permission change for the cloud-based application based on the error report, wherein the identified permission change defines one or more rights to access or control one or more resources in the virtualized computing environment and the identified permission change may permit managing network connections for the cloud-based application and wherein the identified permission change is identified to facilitate a response based on the error report; and allocating the identified permission change to the at least one new or existing member of the virtualized computing environment.

2. The method of claim 1 wherein the allocated permission change comprises one or more temporary permissions.

3. The method of claim 1 wherein the allocated permission change comprises one or more updated permissions.

4. The method of claim 1 wherein the allocated permission change comprises suspending one or more permissions for an existing member of the virtualized computing environment.

5. The method of claim 1 wherein the allocated permission change comprises one or more monitoring permissions to monitor the cloud-based application with regard to the reported error.

6. The method of claim 1 wherein identifying the permission change for the cloud-based application is based on the error identifying data.

7. The method of claim 1 further comprising:
evaluating the allocation of the permission change; and
updating the allocated permission change to the at least one new or existing member of the virtualized computing environment.

8. A computing system implementing a control service for managing permissions for cloud-based applications in a virtualized computing environment, the system comprising:
one or more processors; and
a computer readable storage medium having instructions stored thereon that, when executed by the one or more processors, cause the computing system to:
obtain an error report for a cloud-based application operating within the virtualized computing environment, wherein the error report comprises application identifying data and error identifying data, and an error indicated in the error report is caused by a malware issue;
identify a permission change for the cloud-based application based on the error report, wherein the identified permission change defines one or more rights to access or control one or more resources in the virtualized computing environment and the identified permission change may permit managing network connections for the cloud-based application and wherein the identified permission change is identified to facilitate a response based on the error report; and
allocate the identified permission change to the at least one new or existing member of the virtualized computing environment.

9. The system of claim 8 wherein the allocated permission change comprises one or more temporary permissions.

10. The system of claim 8 wherein the allocated permission change comprises one or more updated permissions.

11. The system of claim 8 wherein the allocated permission change comprises suspending one or more permissions for an existing member of the virtualized computing environment.

12. The system of claim 8 wherein the allocated permission change comprises one or more monitoring permissions to monitor the cloud-based application with regard to the reported error.

13. The system of claim 8 wherein identifying the permission change for the cloud-based application is based on the error identifying data.

14. A method of allocating permissions in a virtualized computing environment, the method comprising:
obtaining an error report for a cloud-based application within the virtualized computing environment, wherein an error indicated in the error report is caused by a malware issue;
identifying temporary permissions for the cloud-based application based on an identity of the application and the error indicated in the error report, wherein the identified temporary permissions define one or more rights to access or control one or more resources in the virtualized computing environment and the identified permission change may permit managing network connections for the cloud-based application and wherein the identified temporary permissions are identified to facilitate a response based on the error report; and
allocating the identified temporary permissions to one or more members of the virtualized computing environment.

15. The method of claim 14 wherein the allocated temporary permissions have durations of effectiveness.

16. The method of claim 14 wherein the allocated temporary permissions comprise one or more updated permissions.

17. The method of claim 14 wherein the allocated temporary permissions comprise one or more monitoring permissions to monitor the cloud-based application with regard to the reported error.

18. The method of claim 14 wherein identifying the temporary permissions for the cloud-based application is based on the error identifying data in the error report.

19. The method of claim 14 wherein the temporary permissions include increasing the size of a cache associated with the cloud-based application.

20. The method of claim 14 wherein the temporary permissions include modifying the content of a cache associated with the cloud-based application.

* * * * *